United States Patent
Kobayashi (10) Patent No.: US 10,779,150 B2
(45) Date of Patent: Sep. 15, 2020

(54) COMMUNICATION SYSTEM

(71) Applicant: ALPS ALPINE CO., LTD., Tokyo (JP)

(72) Inventor: Hiroki Kobayashi, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 0 days.

(21) Appl. No.: 16/726,487

(22) Filed: Dec. 24, 2019

(65) Prior Publication Data

US 2020/0137543 A1 Apr. 30, 2020

Related U.S. Application Data (63) Continuation of application No. PCT/JP2018/016789, filed on Apr. 25, 2018.

(30) Foreign Application Priority Data

Jul. 14, 2017 (JP) ................ 2017-138153

(51) Int. Cl.
| | |
|---|---|
| H04B 7/00 | (2006.01) |
| H04W 4/80 | (2018.01) |
| H04B 1/3827 | (2015.01) |
| H04W 4/20 | (2018.01) |
| G08B 21/18 | (2006.01) |

(52) U.S. Cl.
CPC ............ *H04W 4/80* (2018.02); *H04B 1/385* (2013.01); *H04W 4/20* (2013.01); *G08B 21/182* (2013.01); *H04B 2001/3866* (2013.01)

(58) Field of Classification Search
CPC .......... H04W 4/80; H04W 4/20; H04B 1/385; H04B 1/005
See application file for complete search history.

(56) References Cited

U.S. PATENT DOCUMENTS

| | | | | |
|---|---|---|---|---|
| 2016/0088629 A1* | 3/2016 | Adachi | ............... | H04W 48/18 370/329 |
| 2016/0341556 A1* | 11/2016 | Lin | ..................... | H04W 8/005 |
| 2019/0051134 A1* | 2/2019 | Braiman | ........... | G08B 21/0423 |

FOREIGN PATENT DOCUMENTS

| | | |
|---|---|---|
| JP | 2004-253885 | 9/2004 |
| JP | 2008-276632 | 11/2008 |
| JP | 2016-111719 | 6/2016 |
| JP | 2016-218034 | 12/2016 |
| JP | 2016-219933 | 12/2016 |

OTHER PUBLICATIONS

International Search Report for PCT/JP2018/016789 dated Jul. 17, 2018.

\* cited by examiner

*Primary Examiner* — Tuan Pham
(74) *Attorney, Agent, or Firm* — IPUSA, PLLC (57) ABSTRACT

A communication system includes a first beacon arranged in association with an installation position of a first machine that performs communication in a first frequency band containing a frequency of at least one advertising channel. The first beacon is configured to transmit a first beacon signal at a first advertising channel that falls outside the first frequency band. The communication system further includes a mobile communication device configured to perform a first communication at an advertising channel that falls outside the first frequency band upon satisfying a predetermined condition in a state of receiving the first beacon signal and that differs from the first advertising channel.

4 Claims, 7 Drawing Sheets

WEARABLE DEVICE 15

- 600 ALARM REQUEST GENERATING UNIT
- 602 ADVERTISING CHANNEL DETERMINING UNIT
- 610 UTILIZING CHANNEL INFORMATION STORAGE UNIT

FIG.4

| ADVERTISING CHANNEL OF BEACON SIGNAL | UTILIZING ADVERTISING CHANNEL |
|---|---|
| 37 ch | 39 ch |
| 38 ch | 37 ch |
| 39 ch | 38 ch |

COMMUNICATION SYSTEM

CROSS-REFERENCE TO RELATED APPLICATION

The present application is a continuation application of International Application No. PCT/JP2018/016789 filed on Apr. 25, 2018 and designated the U.S., which is based on and claims priority to Japanese Patent Application No. 2017-138153 filed with the Japanese Patent Office on Jul. 14, 2017, the entire contents of which are hereby incorporated by reference.

BACKGROUND OF THE INVENTION

1. Field of the Invention

The present invention relates to a communication system.

2. Description of the Related Art

A helmet alarm system is known that can signal an alarm to a worker by sending a danger signal to an alarm receiving helmet that the worker is wearing.

However, the prior art as described above makes it difficult to reduce the likelihood of interference with another communication system during communication in an environment where another communication system is present on the periphery. For example, Bluetooth (Registered Trademark) LE (Low Energy) (hereinafter referred to as "BLE") can communicate using an advertising channel, but the presence of a communication system using the same advertising channel in the vicinity increases the likelihood of interference.

PRIOR ART DOCUMENTS

Patent Documents

Patent Document 1: Japanese Laid-Open Patent Application Publication No. 2008-276632

SUMMARY OF THE INVENTION

One embodiment of the present disclosure is intended to reduce the likelihood of interference with another communication system during communication in an environment where another communication system is present in the vicinity.

A communication system according to an embodiment includes a first beacon arranged in association with an installation position of a first machine that performs communication in a first frequency band containing a frequency of at least one advertising channel. The first beacon is configured to transmit a first beacon signal at a first advertising channel that falls outside the first frequency band. The communication system further includes a mobile communication device configured to perform a first communication at an advertising channel that falls outside the first frequency band upon satisfying a predetermined condition in a state of receiving the first beacon signal and that differs from the first advertising channel.

DESCRIPTION OF THE EMBODIMENTS

Hereinafter, each embodiment will be described in detail with reference to the accompanying drawings.

Figure 1:
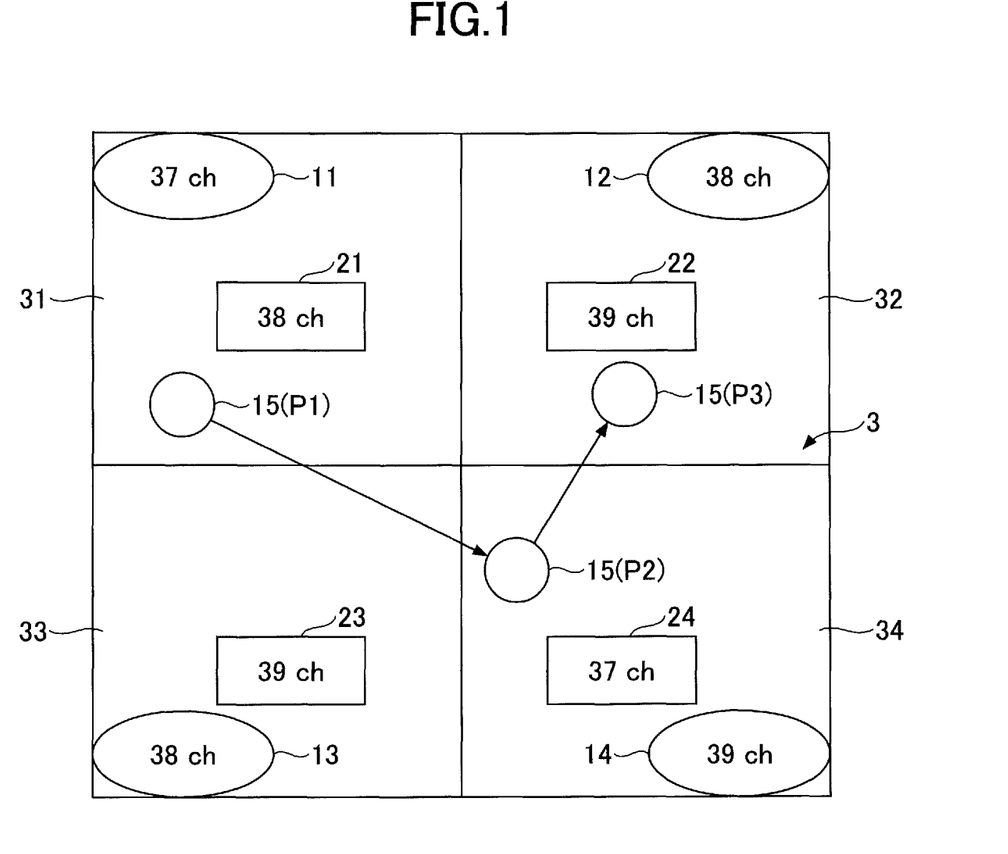
FIG. 1 is a schematic plan view of a workplace 3 to which a communication system 1 is applied.

FIG. 1 is a schematic plan view of a workplace 3 to which a communication system 1 is applied.

In an example illustrated in FIG. 1, four beacons 11, 12, 13, and 14 are provided at different locations in the workplace 3. Specifically, the workplace 3 has four regions 31 to 34, in which the beacons 11 to 14 are provided, respectively. Accordingly, the beacon 11 corresponds to the region 31; the beacon 12 corresponds to the region 32; and the same applies hereinafter.

The four beacons 11, 12, 13, and 14 have a BLE-based communication function. In FIG. 1, advertising channels (37 to 39 channels) fixed and assigned to the four beacons 11, 12, 13, and 14, respectively, are illustrated while being associated with the four beacons 11, 12, 13, and 14, respectively. The beacons 11 to 14 can communicate with a communication device located in the corresponding region (for example, wearable devices 15, as described below) based on the BLE.

In the present example, as an example, the four beacons 11, 12, 13, and 14 each transmit beacon signals at predetermined cycles. On this occasion, the beacons 11 to 14 transmit beacon signals using the respective advertising channels assigned thereto. The advertising channel assigned to each of the four beacons 11, 12, 13, and 14 does not change dynamically, but may be changed during maintenance and the like.

In the example illustrated in FIG. 1, the four robots 21, 22, 23, and 24 are arranged in different installation positions in the workplace 3. Specifically, the robots 21 to 24 are provided in the regions 31 to 34 of the workplace 3, respectively. Accordingly, the robot 21 corresponds to the region 31; the robot 22 corresponds to the region 32; and the same applies hereinafter. In this manner, each of the four beacons 11, 12, 13, and 14 is provided in association with the respective installation positions of the four robots 21, 22, 23, and 24. For example, each of the four beacons 11, 12, 13, and 14 is positioned within a predetermined distance relative to their respective installation positions of the four robots 21, 22, 23, and 24. The predetermined distance is, for example, less than or equal to the propagation distance (communicable distance) of the radio wave based on the BLE. Each of the four beacons 11, 12, 13, and 14 essentially has a function of notifying the installation positions of each of the four robots 21, 22, 23, and 24 with the beacon signals.

For example, each of the four beacons 11, 12, 13, and 14 may be provided directly on each of the four robots 21, 22, 23, and 24. For example, the beacon 11 may be provided directly on the corresponding robots 21. Such a configuration is suitable when the four robots 21, 22, 23 and 24 are movable in a manner that changes their installation position. If the four robots 21, 22, 23 and 24 are movable, the four beacons 11, 12, 13 and 14 can also move with the movement of the corresponding robot.

The four robots 21, 22, 23 and 24 have communication functions other than BLE (for example, SS (spread spectrum) communication functions). Each of the four robots 21, 22, 23 and 24 performs communication in at least two frequency bands, each of which has a frequency associated with one advertising channel. For example, one frequency band A used in the four robots 21, 22, 23 and 24 includes, for example, 2480 MHz (39 channel), but does not include 2402 Hz (37 channel) or 2426 Hz (38 channel), and another frequency band B used in the four robots 21, 22, 23 and 24 includes, for example, 2402 Hz (37 channel), but does not include 2480 MHz (39 channel) or 2426 Hz (38 channel). In this case, the 39 channel of the advertising channel falls within the frequency band A, and the 37 channel of the advertising channel falls within the frequency band B.

In FIG. 1, the advertising channels (37 channel to 39 channel) belonging to the frequency band used in each of the four robots 21, 22, 23, and 24 are illustrated corresponding to each of the four robots 21, 22, 23, and 24. The robots 21 to 24 are capable of communicating with communication devices located in the corresponding region. The number of beacons and the number of robots in the workplace 3 are set to any numbers, and the arrangement is set to any arrangement.

In the example illustrated in FIG. 1, the communication system 1 includes four beacons 11, 12, 13, and 14 and a wearable device 15 (an example of a mobile communication device). FIG. 1 schematically illustrates a way of the wearable device 15 moving with the worker retaining the wearable device 15 at three positions P1 to P3.

The wearable device 15 is possessed or held, for example, by a worker working in the workplace 3. The form in which the wearable device 15 is possessed or held may be made any form, for example, the wearable device 15 may be held on the helmet that the operator is wearing. The wearable device 15 has a BLE-based communication function. Hereinafter, the term "worker" refers to a worker who possesses or holds the wearable device 15, unless otherwise stated.

In the present embodiment, for example, the wearable device 15 is a device capable of measuring the biometric information of a worker based on an optically obtained measurement signal. Optically measurable biometric information may be any information, for example, the blood oxygen concentration information of an organism (for example, a human).

Next, an alarm system 500 incorporating a communication system 1 will be described with reference to FIG. 2.

Figure 2:
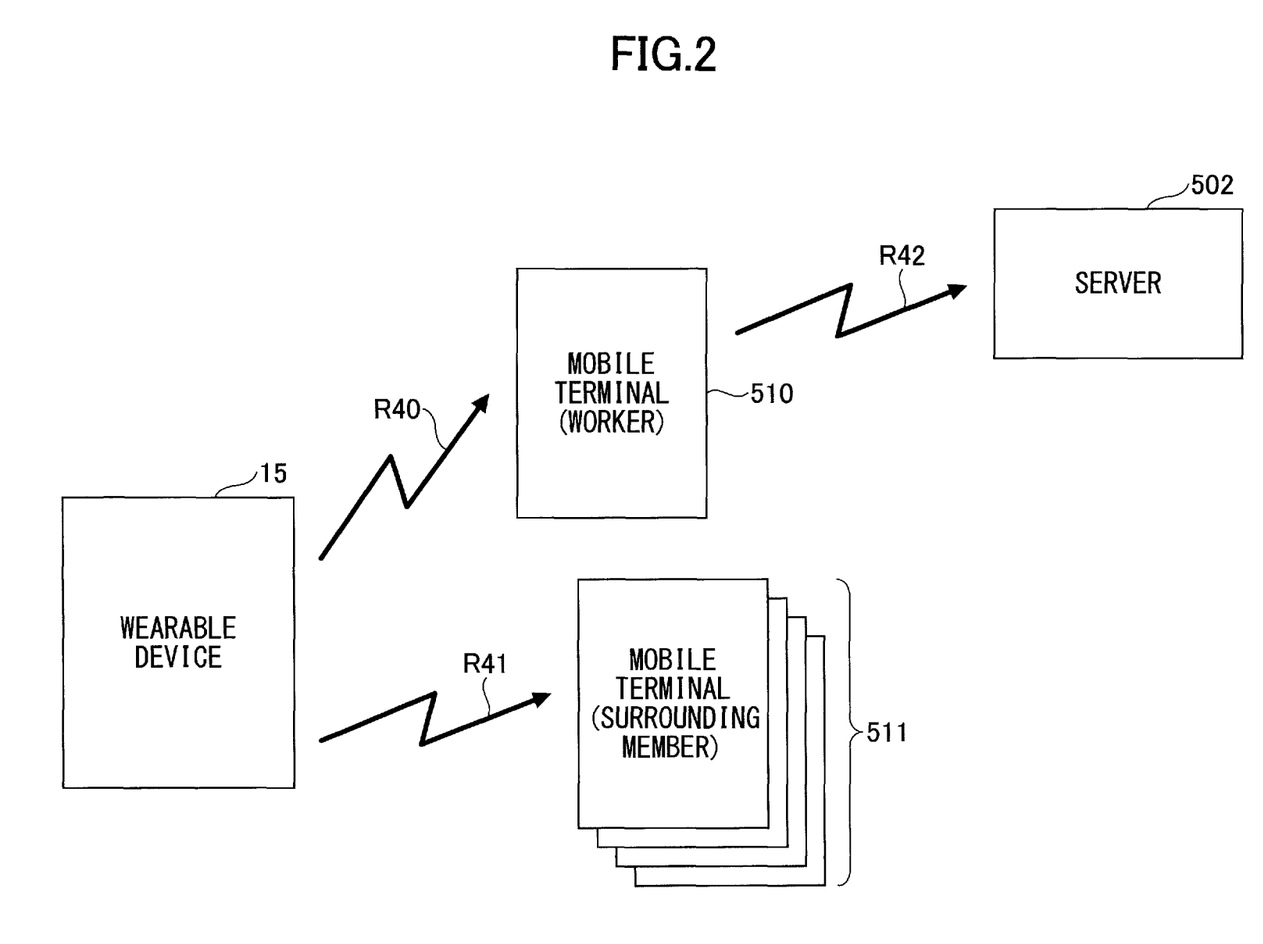
FIG. 2 is a diagram schematically illustrating a basic configuration of an alarm system 500.

FIG. 2 schematically illustrates a basic configuration of the alarm system 500.

The alarm system 500 includes a wearable device 15, a mobile terminal 510, a mobile terminal 511, and a server 502.

The mobile terminal 510 is possessed by a worker (user). The mobile terminal 511 is possessed by neighboring members (for example, other workers). The neighboring members are members present in the same workshop 3.

The wearable device 15 determines whether an alarm is required based on the worker's condition that can be estimated from the measurement signal. For example, the wearable device 15 generates an alarm request when an abnormality is detected in a worker's pulse wave. In this case, the communication module 159 sends an alarm request at the advertising channel. Once an alarm request is sent at the advertising channel, a mobile terminal (a mobile terminal 510 of the worker or a mobile terminal 511) in the vicinity of the wearable device 15 can receive the alarm request (see arrows R40 and R41). The mobile terminal 510 transmits an alarm request to the server 502 upon receiving the alarm request (see arrow R42). The transmission to the server 502 may be accomplished by communication based on the LTE (Long Term Evolution). This allows the monitors on the server 502 side and the surrounding members to quickly notice the worker's abnormality and take a necessary action, such as a treatment. Similarly, the mobile terminal 511 of the surrounding member may also send an alarm request to the server 502 upon receiving the alarm request in the advertising channel.

In the meantime, if such an alarm system 500 is implemented in the workplace 3, depending on the frequency used to transmit the alarm request, interference may occur with the radio waves used in another communication system, such as robots 21 to 24, thereby affecting the operation of robots 21 to 24. In particular, in the configuration in which communication related to the arrows R40 and R41 is executed in the advertising channel, interference is a problem because the advertising channel falls within the frequency band used in the robots 21 to 24.

Also, in the alarm system 500, it may be useful for an alarm request to be transmitted quickly to the mobile terminal 510 or the mobile terminal 511 of a surrounding member. That is, it is useful for the communication represented by the arrows R40 and R41 to be implemented in a manner that there is no interference or the like. In this regard, because the robots 21 to 24 are present in the workplace 3, there is a possibility of interference between the communication indicated by the arrows R40 and R41 and the radio waves used in the robots 21 to 24.

The following describes the configuration related to the interference prevention function that can reduce the possibility of such interference.

Figure 3:
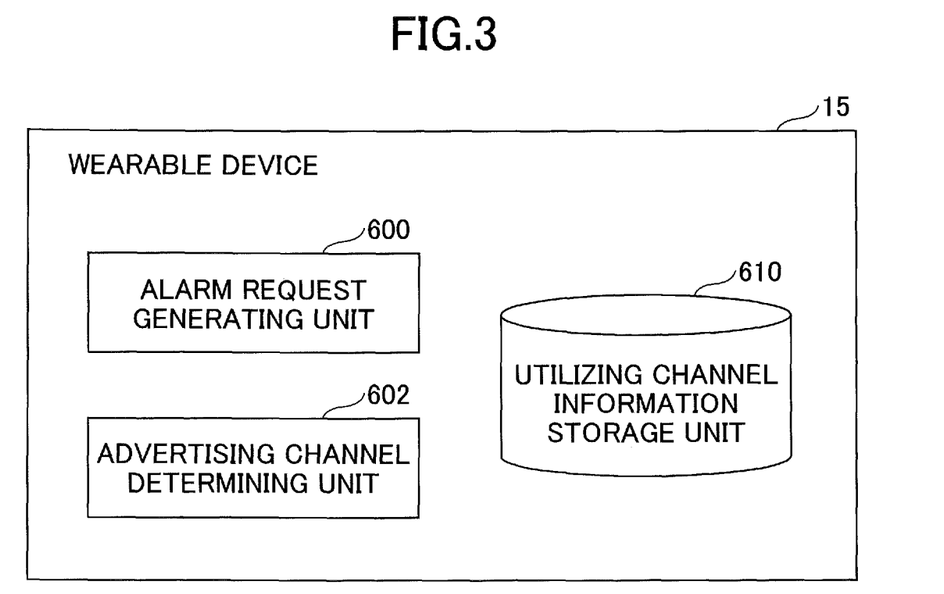
FIG. 3 is a functional block diagram illustrating an example of an interference prevention function of an integrated module 150 of a wearable device 15.

FIG. 3 is a functional block diagram illustrating an example of a configuration related to an interference prevention function of an integrated module 150 of a wearable device 15.

The integrated module 150 includes an alarm request generating unit 600, an advertising channel determining unit 602, and a utilizing channel information storage unit 610. The alarm request generating unit 600 and the advertising channel determining unit 602 can be implemented when a CPU (central processing unit) of the wearable device 15 executes one or more programs in a memory. The utilizing channel information storage unit 610 can be implemented by a storage unit (not illustrated) of the wearable device 15.

The alarm request generating unit 600 generates an alarm request when a predetermined condition is satisfied. In this embodiment, the alarm request generating unit 600 generates an alarm request when an abnormality of a worker is detected based on a measurement signal. For example, the alarm request generating unit 600 generates an alarm request when an abnormality is detected in a pulse wave of a worker.

The advertising channel determining unit 602 determines an advertising channel (hereinafter, also referred to as the "utilizing advertising channel") when an alarm request is transmitted through the communication module 159 based on information (hereinafter, referred to as the "utilizing channel information") in the utilizing channel information storage unit 610.

The utilizing channel information is predefined for each of the advertising channels of the beacons 11, 12, 13, and 14 (see FIG. 1) in the workplace 3. In the utilizing channel information, an advertising channel that is different from the advertising channel assigned to a beacon and that falls outside the frequency band used in the robot associated with the beacon, is associated with one advertising channel as the utilizing advertising channel, based on the beacon to which the one advertising channel is assigned. For example, in the example illustrated in FIG. 1, the beacon 11 is allocated to the 37 channel, for example, and the robot 21 to which the beacon 11 is matched uses a frequency band containing the 38 channel. Therefore, for the beacon signal received at the 37 channel, the 39 channel is defined as a utilizing advertising channel.

Figure 4:
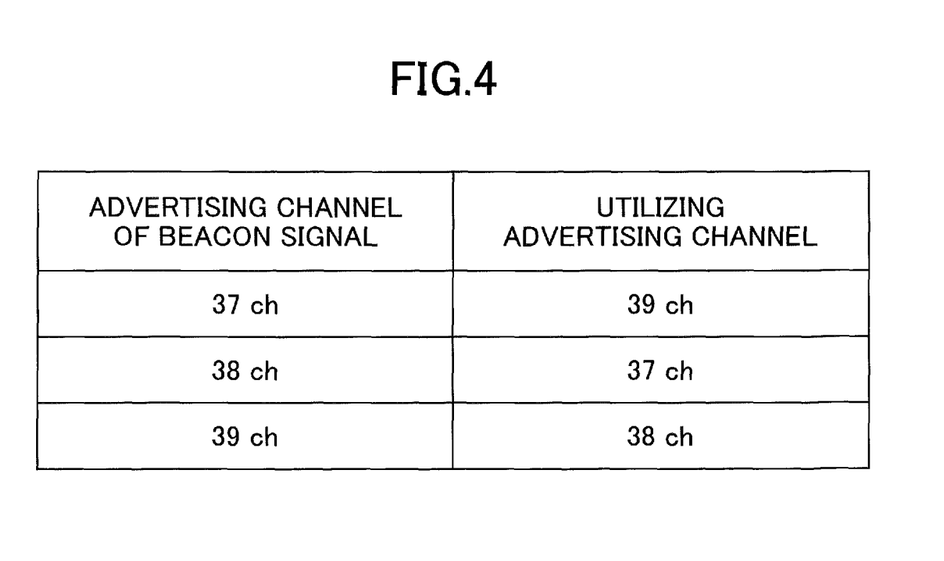
FIG. 4 is a diagram illustrating an example of utilizing channel information in a utilizing channel information storage unit 610.

FIG. 4 is a diagram illustrating an example of utilizing channel information in the utilizing channel information storage unit 610. Although the form of the utilizing channel information is made any form, for example, in the example illustrated in FIG. 4, the utilizing channel information is expressed in relation to the utilizing advertising channel and the advertising channel assigned to each beacon.

The advertising channel determining unit 602 determines a utilizing advertising channel depending on an advertising channel upon receiving a beacon signal. In the example illustrated in FIG. 4, when the beacon signal is received at the 37th channel, the advertising channel determining unit 602 determines that the 39 channel is the utilizing advertising channel. When the beacon signal is received at the 38 channel, the advertising channel determining unit 602 determines that the 37th channel is the utilizing advertising channel. When the beacon signal is received at the 39 channel, the advertising channel determining unit 602 determines that the 38 channel us the utilizing advertising channel. The communication module 159 transmits an alarm request using the utilizing advertising channel determined by the advertising channel determination unit 602.

In this manner, according to the present embodiment, depending on the advertising channel at the time of receiving the beacon signal, the utilizing advertising channel is determined not to be included the frequency band used in the neighboring robot based on the utilizing channel information. Accordingly, it is possible to reduce the likelihood of interference with another communication system during communication in an environment where another communication system (for example, the robot 21) is present within the workplace 3.

Next, with reference to FIG. 1 again, an example of a change in the utilizing advertising channel associated with a movement of the wearable device 15 within the workplace 3 will be described with reference to FIGS. 5A through 5C.

Here, as illustrated in FIG. 1, the frequency band used in the robot 21 includes the 38 channel, the frequency band used in the robot 22 includes the 39 channel, the frequency band used in the robot 23 includes the 39 channel, and the frequency band used in the robot 24 includes the 37th channel. An advertising channel that is smaller by only one than the advertising channel contained in the frequency band of the corresponding robot is assigned to each of the four beacons 11, 12, 13 and 14. Here, the advertising channel that is smaller by only one than the 37 channel is made the 39 channel. Specifically, it is assumed that the 37th channel is allocated to the beacon 11; the 38 channel is allocated to the beacon 12; the 38 channel is allocated to the beacon 13; and the 39 channel is allocated to the beacon 14. In this case, as illustrated in FIG. 4, the utilizing channel information defines an advertising channel that is smaller by only one than the advertising channel associated with the received beacon signal as a utilizing advertising channel.

Figure 5A:
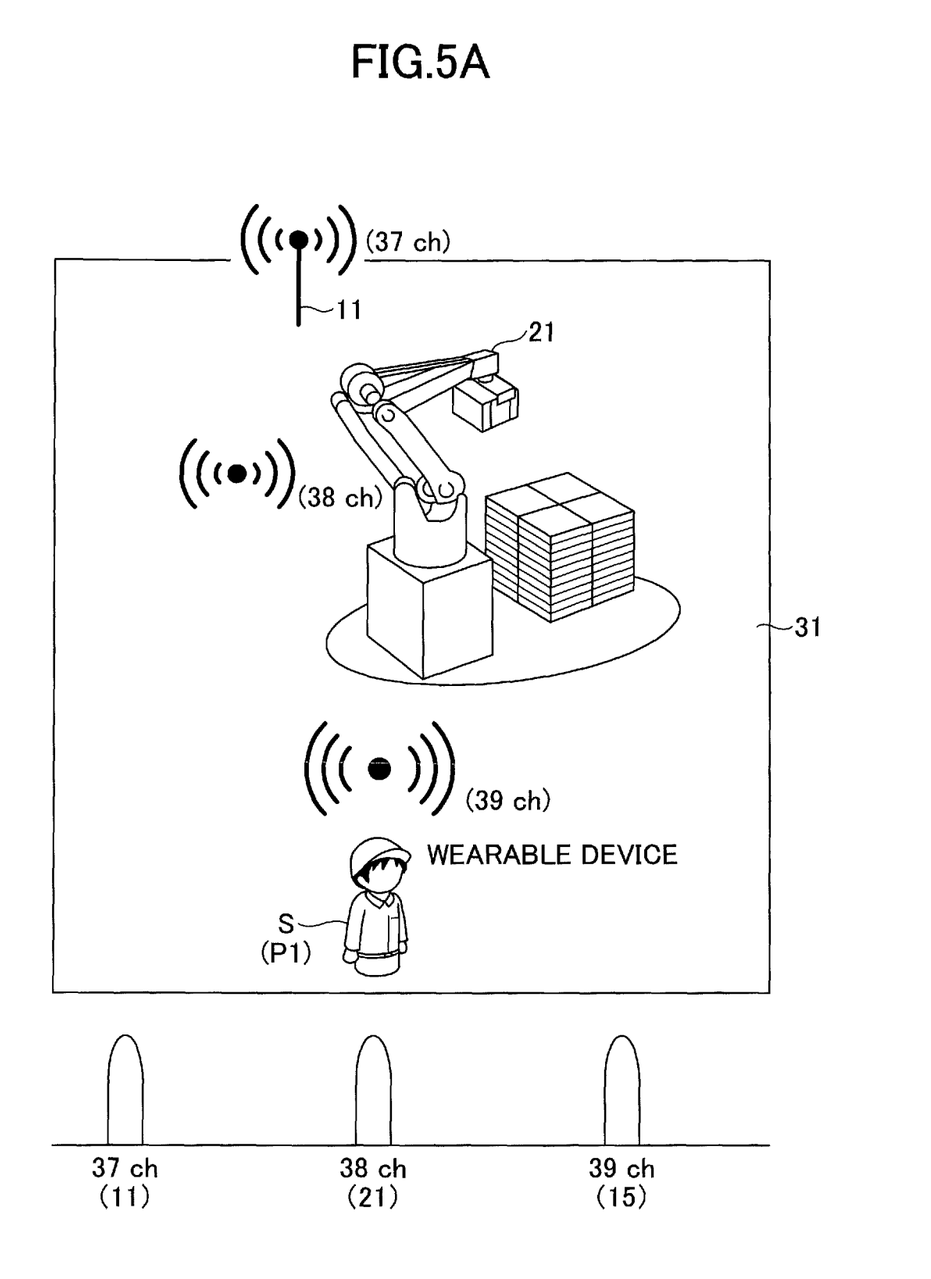
FIG. 5A is a diagram illustrating an example of a dynamic change of a utilizing advertising channel in association with a movement of a worker.
Figure 5B:
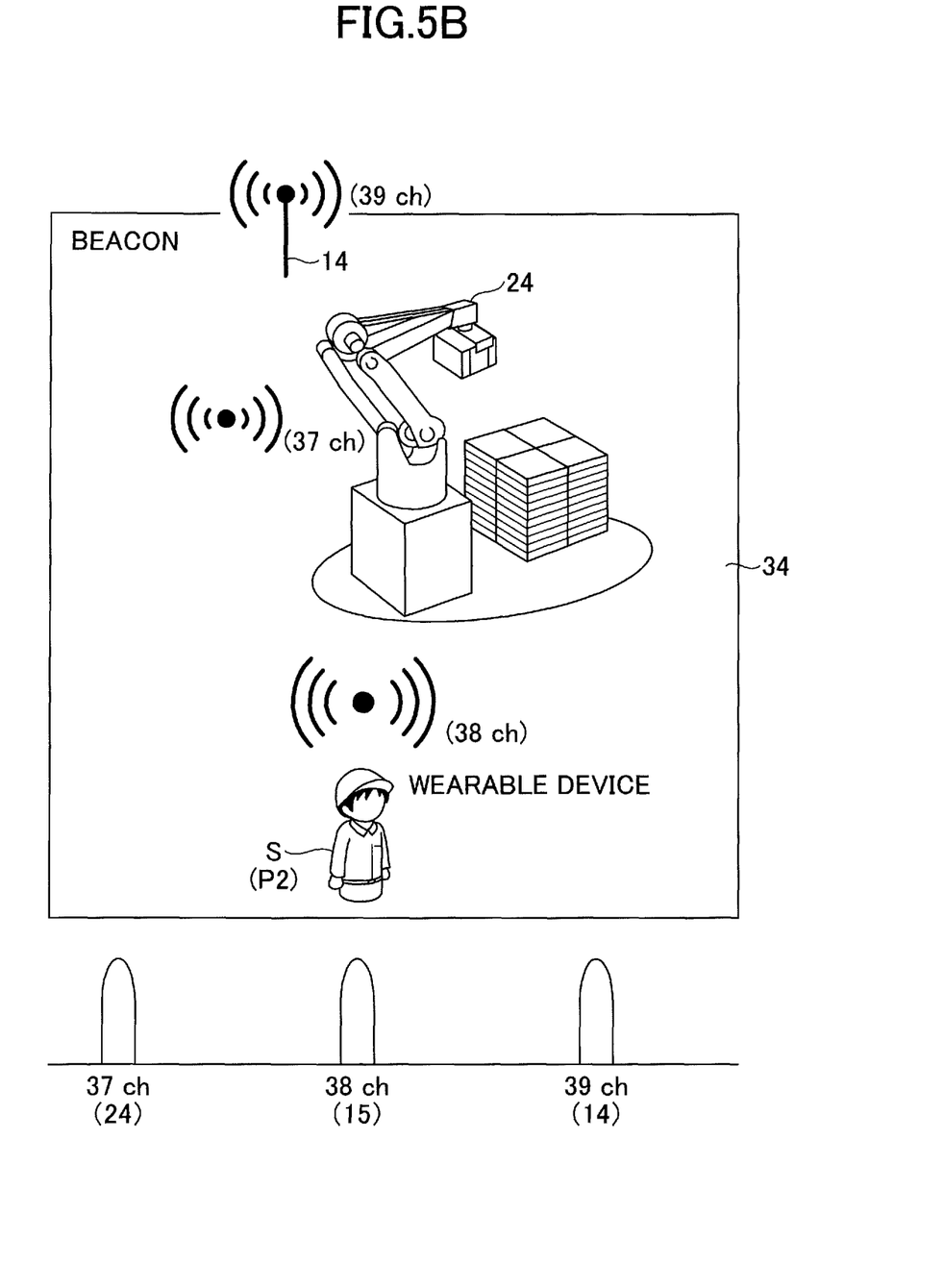
FIG. 5B is a diagram illustrating an example of a dynamic change of a utilizing advertising channel associated with a movement of a worker.
Figure 5C:
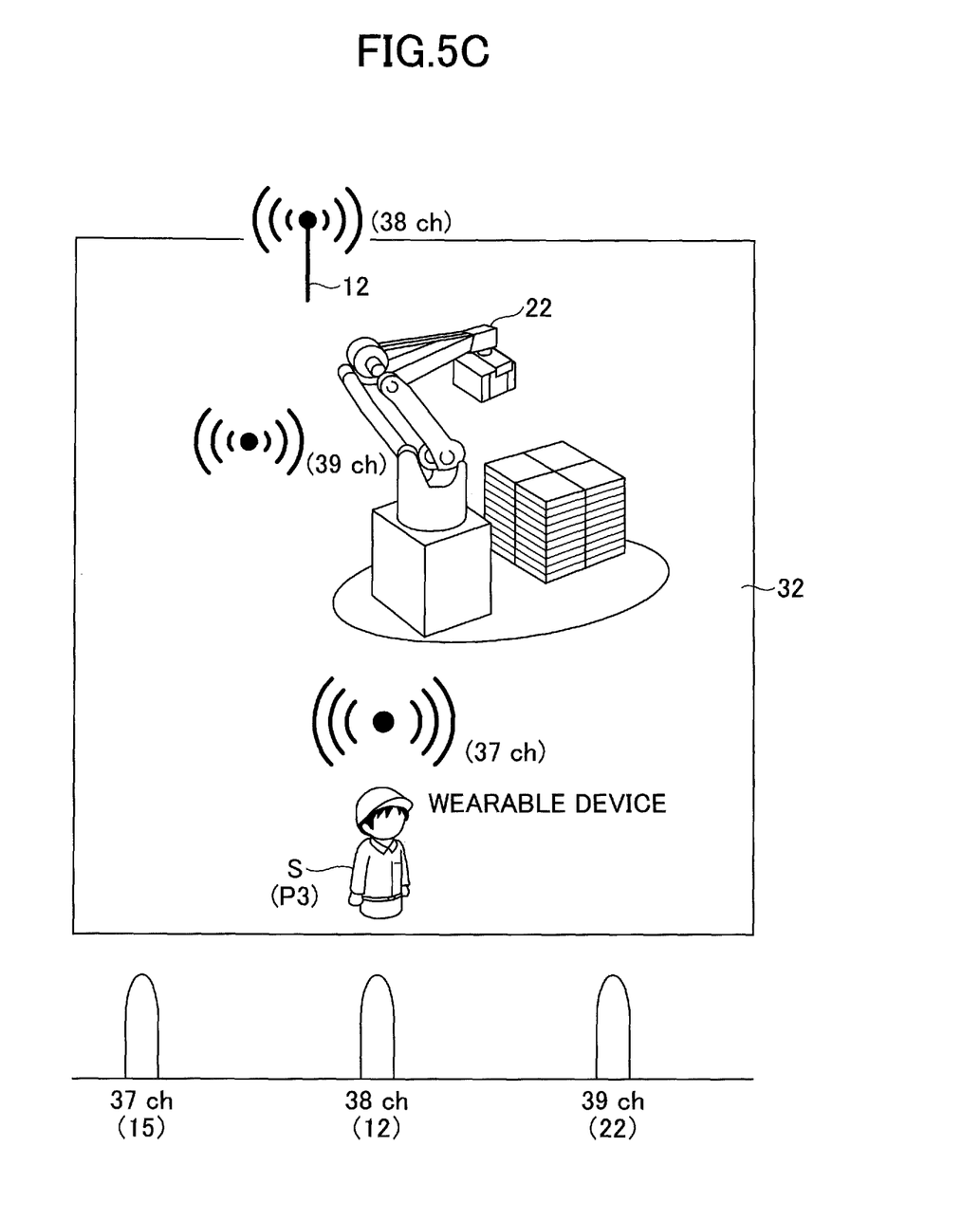
FIG. 5C is a diagram illustrating an example of a dynamic change of a utilizing advertising channel associated with a movement of a worker.

FIGS. 5A to 5C are explanatory diagrams of a utilization situation of advertising channels at each position P1 to P3 of a wearable device 15 in a workplace 3. FIG. 5A illustrates a utilization situation at the position P1 of the wearable device 15. FIG. 5B illustrates a utilization situation at the position P2 of the wearable device 15. FIG. 5C illustrates a utilization situation at the position P3 of the wearable device 15. In FIGS. 5A to 5C, a beacon and a robot in the same region are schematically illustrated on the upper side, along with a worker S, and the utilization situation of the advertising channels is illustrated on the lower side. The utilization situation of the 37, 38 and 39 channels is illustrated as the utilization situation of the advertising channels, and numbers in parentheses at the bottom of each of the 37, 38 and 39 channels represent reference signs of the utilizing devices that are any of the beacons 11 to 14, the robots 21 to 24 and the wearable device 15. With respect to the robots 21 to 24, the utilization situation of the advertising channel means that the advertising channel falls within the utilizing frequency band.

As illustrated in FIGS. 1 and 5A, when the wearable device 15 is at the position P1 in the region 31, the wearable device 15 is in a state of receiving a beacon signal from the beacon 11. That is, the beacon signal is received at the 37 channel. Accordingly, in such a situation, when an alarm request is generated, the advertising channel determining unit 602 determines that the 39 channel is the utilizing advertising channel, as schematically illustrated in FIG. 5A. The 39 channel falls outside the frequency band used in the robot 21 in the region 31. Accordingly, the probability of interference with another communication system during communication of the alarm request from the wearable device 15 is decreased.

Similarly, as illustrated in FIGS. 1 and 5B, when the wearable device 15 is in the position P2 in the region 34, the wearable device 15 is in a state of receiving a beacon signal from the beacon 14. That is, the beacon signal is received at the 39 channel. Accordingly, when an alarm request is generated in such a situation, the advertising channel determining unit 602 determines that the 38 channel is the utilizing advertising channel, as schematically illustrated in FIG. 5B. The 38 channel falls outside the frequency band used by the robot 24 in the region 34. Accordingly, the probability of interference with another communication system during communication of the alarm request from the wearable device 15 is decreased.

Similarly, as illustrated in FIGS. 1 and 5C, when the wearable device 15 is at the position P3 in the region 32, the wearable device 15 is in a state of receiving a beacon signal from the beacon 12. That is, the beacon signal is received at the 38 channel. Accordingly, when an alarm request is generated in such a situation, the advertising channel determining unit 602 determines that the 37 channel is the utilization advertising channel, as schematically illustrated in FIG. 5C. The 37 channel falls outside the frequency band used by the robot 22 in the region 32. Accordingly, the probability of interference with another communication system during communication of the alarm request from the wearable device 15 is decreased.

In this manner, in the present embodiment, as the wearable device 15 moves within the workplace 3, the utilizing advertising channel of the wearable device 15 dynamically changes from the 39 channel to the 37 channel. This decreases the possibility of interference with another communication system during communication of an alarm request from the wearable device 15, even when the worker S moves within the workplace 3.

Figure 6:
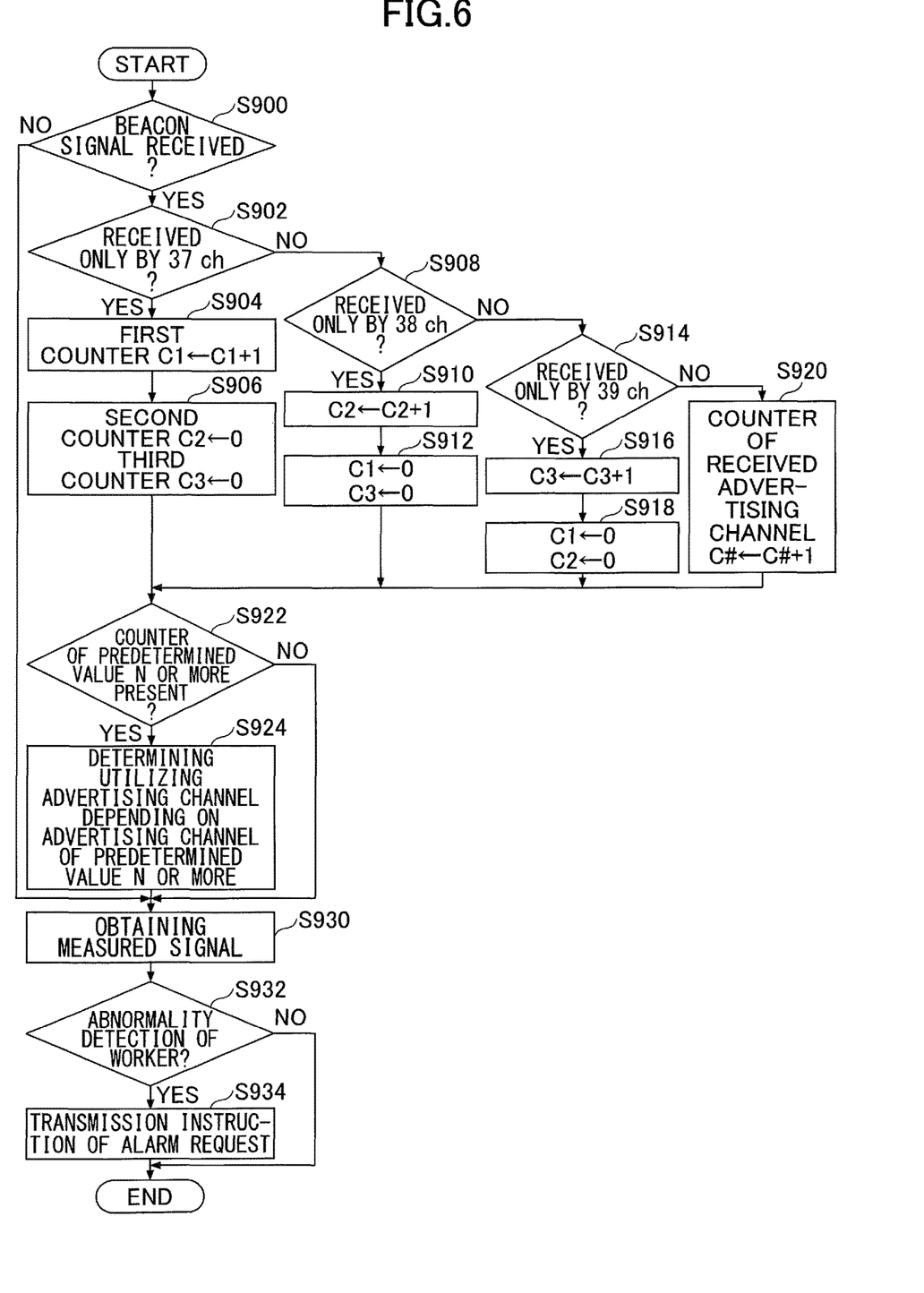
FIG. 6 is a flowchart illustrating an example of a process implemented by a wearable device 15.

FIG. 6 is a schematic flowchart illustrating an example of processing implemented by the wearable device 15. The process illustrated in FIG. 6 is performed, for example, at each cycle.

In step S900, the advertising channel determining unit 602 determines whether or not a beacon signal has been received from the previous cycle to the current cycle. If the determination result is "YES," the process proceeds to step S902. Otherwise, the process proceeds to step S930.

In step S902, the advertising channel determining unit 602 determines whether or not the beacon has been received only at the 37 channel. If the determination result is "YES," the process proceeds to step S904, and otherwise, proceeds to step S908.

In step S904, the advertising channel determining unit 602 increments the first counter C1 by only "1." The first counter C1 represents the number of consecutive receptions of the beacon signal at the 37 channels. The initial value of the first counter C1 is "0."

In step S906, the advertising channel determining unit 602 resets or keeps the second and third counters C2 and C3 at "0." The second counter C2 indicates the number of consecutive receptions of the beacon signal at the 38 channel. The initial value of the counter C2 is "0." The third counter C3 indicates the number of consecutive receptions of the beacon signal at the 39 channel. The initial value of the counter C3 is "0."

In step S908, the advertising channel determining unit 602 determines whether or not the beacon signal has been received only at the 38 channel. If the determination result is "YES," the process proceeds to step S910, and otherwise, proceeds to step S914.

In step S910, the advertising channel determining unit 602 increments the second counter C2 by only "1."

In step S912, the advertising channel determining unit 602 resets or keeps the first and third counters C1 and C3 at "0."

In step S914, the advertising channel determining unit 602 determines whether or not the beacon signal has been received only at the 39 channel. If the determination result is "YES," the process proceeds to step S916, and otherwise, proceeds to step S920.

In step S916, the advertising channel determining unit 602 increments the third counter C3 by only "1."

In step S918, the advertising channel determining unit 602 resets or keeps the first and second counters C1 and C2 at "0."

In step S920, the advertising channel determining unit 602 increments the counter corresponding to the received advertising channel by only "1" among the first counters C1 to C3, and resets or maintains the other counters to "0."

In step S922, the advertising channel determining unit 602 determines whether or not there is a counter whose counter value is equal to or more than a predetermined value N among the first counters C1 through the third counter C3. The advertising channel determining unit 602 determines whether or not a beacon signal is received at the same advertising channel consecutively for a predetermined number of times of N or more. If the determination result is "YES," the process proceeds to step S924, and otherwise, proceeds to step S930.

In step S924, the advertising channel determining unit 602 determines the current value of the utilizing advertising channel based on a counter whose counter value is equal to or more than a predetermined value N and the utilizing channel information. For example, when a counter having a counter value equal to or more than a predetermined value N is the first counter C1, it means that a beacon signal is received consecutively for a predetermined number of times of N or more at the 37 channel. Accordingly, the advertising channel determining unit 602 determines that the 39 channel is the current value of the utilizing advertising channel based on the utilizing channel information. When there are two or more counters having a predetermined value of N or more, the counter having the highest counter value may have a priority.

If the determination result in step S922 is "NO," and does not go through step S924, the advertising channel determining unit 602 keeps the current value of the utilizing advertising channel at the previous value (i.e., the utilizing advertising channel becomes the current value←the previous value). In the first processing, the advertising channel determining unit 602 may determine the current value of the utilizing advertising channel based on a counter whose counter value is "1."

In step S930, the alarm request generating unit 600 acquires a measurement signal.

In step S932, the alarm request generating unit 600 determines whether or not an error is detected by a worker based on the measurement signal. If the determination result is "YES," the process proceeds to step S934. Otherwise, the process ends without change.

In step S934, the alarm request generating unit 600 provides a transmission instruction of the alarm request to the communication module 159. In this case, the communication module 159 transmits an alarm request using the current value of the utilizing advertising channel.

According to the process illustrated in FIG. 6, when the beacon signal is received consecutively for a predetermined number of times of N or more at the same advertising channel, the utilizing advertising channel can be switched. Thus, for example, even when the wearable device 15 is located at a position that can receive two beacon signals simultaneously, the utilizing advertising channel having a less interference possibility can be determined.

In the present embodiment, a robot that communicates in a certain frequency band (referred to as a "first frequency band" in this case) of the four robots 21, 22, 23, and 24 is an example of a first machine, and a robot that communicates in a frequency band (referred to as a "second frequency band" in this case) different from the first frequency band is an example of a second machine. One example of the first beacon is a beacon corresponding to the installation position of the robot that communicates in the first frequency band of the four robots 21, 22, 23, and 24, and the beacon signal transmitted by the beacon is an example of the first beacon signal. Similarly, one example of the second beacon is a beacon corresponding to the installation position of the robot that communicates in the second frequency band of the four robots 21, 22, 23, and 24, and the beacon signal transmitted by the beacon is an example of the second beacon signal. An advertising channel that falls outside the first frequency band of the 37, 38, and 39 channels is an example of the first advertising channel, and an advertising channel that falls outside the second frequency band of the 37, 38, and 39 channels is an example of the second advertising channel.

Although each embodiment has been described in detail above, it is not intended to be limited to any particular embodiment, and various modifications and alternations may be made within the scope of the claims. It is also possible to combine all or multiple parts of the components of the above-described embodiment.

For example, in the above-described embodiment, although the robots 21, 22, 23, and 24 are illustrated as one example of another communication system in the workplace 3, any another communication system is acceptable.

Also, in the above-described embodiment, the communication system 1 is incorporated into the alarm system 500 in the workplace 3, but can be used in a system other than the alarm system. For example, the present invention may be applied to the transmission of information that is different from an alarm request from the wearable device 15.

As discussed above, a communication system according to an embodiment can decrease the possibility of interference with another communication system during communication in an environment in which another communication system is present in the vicinity.

What is claimed is:

1. A communication system, comprising:
   a first beacon arranged in association with an installation position of a first machine that performs communication in a first frequency band containing a frequency of at least one advertising channel, the first beacon being configured to transmit a first beacon signal at a first advertising channel that falls outside the first frequency band; and
   a mobile communication device configured to perform a first communication at an advertising channel that falls outside the first frequency band upon satisfying a predetermined condition in a state of receiving the first beacon signal and that differs from the first advertising channel.

2. The communication system as claimed in claim 1, further comprising:
   a second beacon arranged in association with an installation position of a second machine that performs communication in a second frequency band different from the first frequency band, the second beacon being configured to transmit a second beacon signal at a second advertising channel that falls outside the second frequency band,
   wherein the mobile communication device performs a second communication at an advertising channel that falls outside the second frequency band upon satisfying the predetermined condition in a state of receiving the second beacon signal and that differs from the first advertising channel.

3. The communication system as claimed in claim 2,
   wherein the first beacon and the second beacon periodically transmit the first beacon signal and the second beacon signal, respectively,
   wherein the state of receiving the first beacon signal is a state of receiving the first beacon signal consecutively a predetermined number of times or more, and
   wherein the state of receiving the second beacon signal is a state of receiving the second beacon signal consecutively the predetermined number of times or more.

4. The communication system as claimed in claim 1,
   wherein the first machine is movable in a form such that the installation position is variable, and
   wherein the first beacon is movable together with the first machine.

* * * * *